April 18, 1961     L. N. YOHE     2,980,365
AIRCRAFT WITH ROTARY LIFTING AIRFOILS Filed Dec. 5, 1958     4 Sheets-Sheet 1

INVENTOR.
LESTER N. YOHE

April 18, 1961 L. N. YOHE 2,980,365
AIRCRAFT WITH ROTARY LIFTING AIRFOILS
Filed Dec. 5, 1958 4 Sheets-Sheet 2

INVENTOR.
LESTER N. YOHE

April 18, 1961     L. N. YOHE     2,980,365
AIRCRAFT WITH ROTARY LIFTING AIRFOILS
Filed Dec. 5, 1958     4 Sheets-Sheet 3

INVENTOR.
LESTER N. YOHE

April 18, 1961 L. N. YOHE 2,980,365
AIRCRAFT WITH ROTARY LIFTING AIRFOILS
Filed Dec. 5, 1958 4 Sheets-Sheet 4

INVENTOR.
LESTER H. YOHE

United States Patent Office 2,980,365
Patented Apr. 18, 1961

2,980,365
AIRCRAFT WITH ROTARY LIFTING AIRFOILS
Lester N. Yohe, 1601 Melrose Ave., Havertown, Pa.
Filed Dec. 5, 1958, Ser. No. 778,347
11 Claims. (Cl. 244—23)

This invention relates to aircraft and more particularly to aircraft of the vertical lift type.

The primary object of this invention is to provide a vertical lift type aircraft capable of use as an aircraft for observation and like purposes, capable of use as a drone, or capable of use as a passenger or cargo carrying vehicle.

It is a further object to provide a vertical lift type aircraft which is small in size in relation to its load carrying abilities and which possesses the desired characteristic of a high load to power ratio.

A further object is to provide a vertical lift type aircraft which is stable and which will descend slowly in the event of a power failure.

A further object is to provide a vertical lift type aircraft with simplified translational flight controlling means.

Other objects of the invention, as well as the advantages thereof, will become apparent from the following description when read in conjunction with the accompanying drawings in which.

Figure 1:
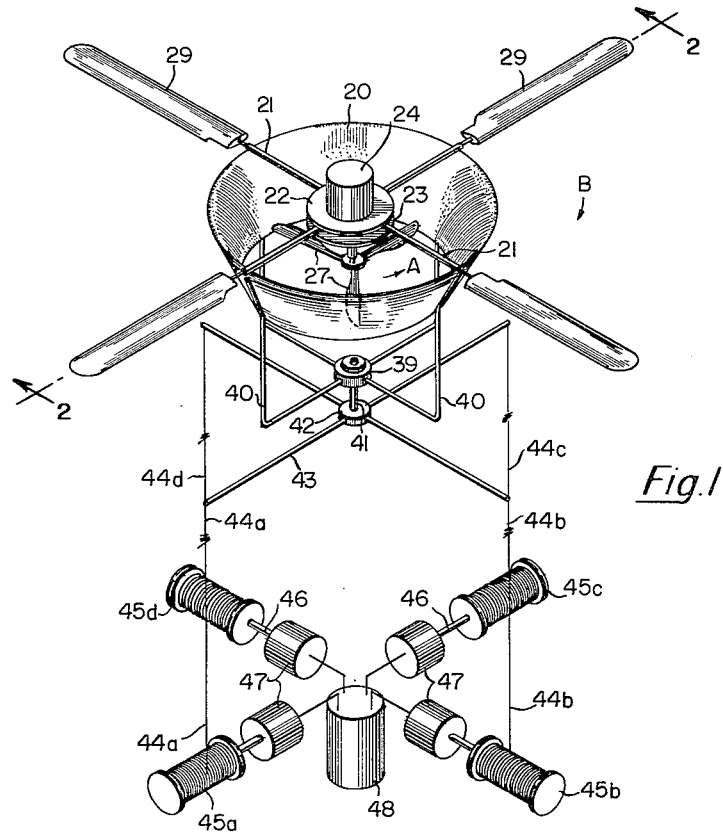
Fig. 1 is a perspective view of an aircraft in accordance with the present invention and provided with means for utilizing the aircraft for observation or like purposes.

Referring first to Figs. 1 through 4 inclusive, there is shown an aircraft comprising a duct 20 formed by an annular airfoil, the chord line of which is preferably disposed at an angle to the center line of the duct and the cambered surface of which defines the inner surface of the duct. Although the chord line of the annular airfoil comprising the duct 20 is shown disposed at an angle of approximately 45° to the horizontal, the present invention is not to be construed as being limited in such respect.

Four sleeve members 21 spaced 90° to one another are fixedly attached as by welding or other suitable means to the upper edge or inlet of the duct 20 and extend inwardly where they are attached by means not shown to spaced plates 22 and 23 upon which is mounted the power plant 24. A shaft 25, driven by the power plant 24, extends downwardly through a shaft housing 26 and is provided on its lower extremity with a variable pitch impeller 27. This impeller is preferably located in the lower exit portion of the duct 20 and is preferably of a diameter slightly greater than the exit diameter of the duct.

As shown, spar members 28 extend through the sleeves 21 for rotation therein and carry airfoils 29 on their outer portions. The inner extremity of the spar members 28 are provided with pitch control arms 30 having rollers 31 which are contained between upper and lower plates 32 and 33 of a plate assembly 34 including spacers 35 and rivets or other suitable fastener means 36 for maintaining the upper and lower plates in fixed spaced relationship. Jack screws 37 threadedly engaging the motor mounting plate 23 and provided with lock nuts 38, are attached at their upper ends to the lower plate 33 and are thereby adapted to raise or lower the plate assembly 34. It is readily apparent that raising or lowering the plate assembly will raise or lower the rollers 31 on the ends of the pitch arms 30 which in turn will rotate the spars and thereby increase or decrease the pitch of the airfoils 29.

Referring again to Figs. 1 and 2, a bearing 39, suspended from the duct 20 by means of struts 40 or the like, rotatably supports a spindle 41 provided with a hub portion 42 from which radiate four arms 43 spaced 90° to one another. Cables 44a–44d are attached to the outer extremities of the arms 43 and extend downwardly to wrap around drums 45a–45d respectively carried by fixed ground structure not shown. The drums 45a–45d are operatively connected by shafts 46 to torque motors 47 supplied with power from a generator 48.

Operation of the device described thus far is as follows:

Operation of the power plant 24 drives the impeller 27 in the direction of the arrow A, Fig. 1. The torque reaction is transmitted through the motor mounting plates 22 and 23 to the sleeve members 21 to thereby cause rotation of the airfoils 29, along with the duct 20, in the direction of the arrow B. The airfoils 29 thus produce lift in addition to that produced by the impeller-duct combination. The speeds of opposite rotation of the impeller and the rotating airfoils and duct will of course be dependent upon the power setting, the pitch setting of the blades of the impeller and the pitch setting of the airfoils as determined by the manual setting of the jack screws 37. The device is thus caused to assume flight in the vertical direction to an altitude as determined by the length of the cables 44a–44d. The entire length of the cables is not payed-out however, but a sufficient length thereof remains wound upon the drums such that any disturbance to the captive aircraft resulting from gusts or the like results in a pull on any one cable which is sensed by the torque motor associated with that cable experiencing the pull. The torque motor in turn and in a manner well known in the art, exerts a counterpull on that cable to therefore maintain the attitude of the aircraft level at all times.

Figure 5:
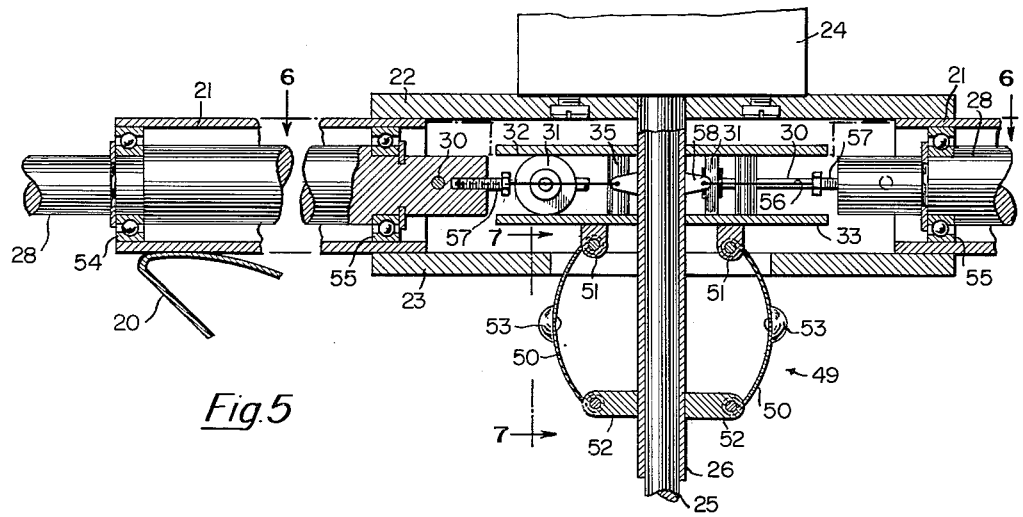
Figs. 5 and 6 are enlarged sectional views showing a modification including governor means for controlling the pitch of the rotating airfoils.
Figure 6:
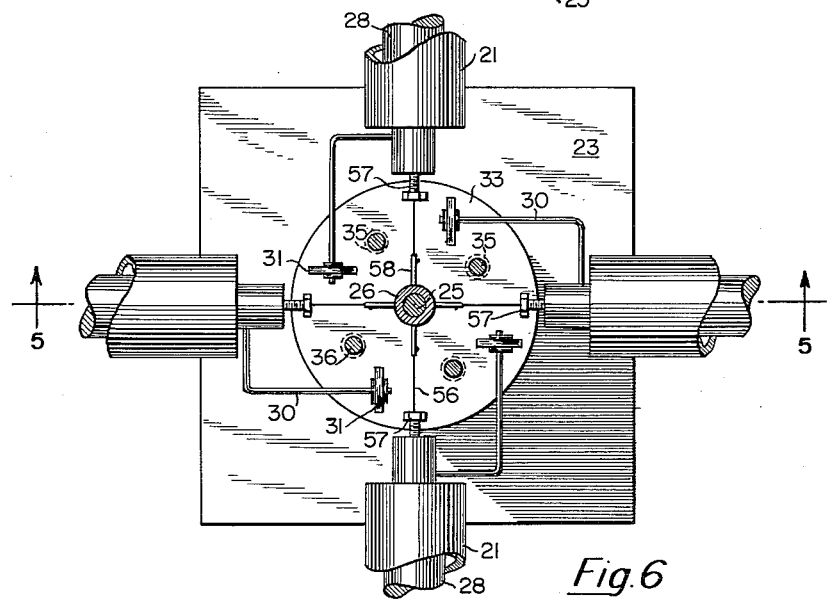
Figure 7:
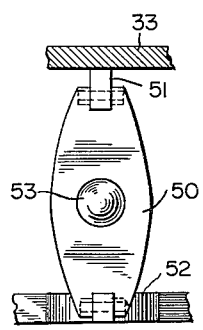
Fig. 7 is an enlarged view taken along line 7—7 of Fig. 5.

Referring now to Figs. 5, 6 and 7, there is shown a modification of the means for controlling the pitch of the rotating airfoils 29. These means comprise a governor 49 consisting of flat spring 50 pivotally attached at their upper ends to flanges 51 provided on the lower plate 33 of the plate assembly 34 and at their lower ends to opposed lugs 52 mounted upon the impeller shaft housing 26, and provided with weights 53 at the center portions thereof. The arrangement is such that as the speed of rotation of the airfoils 29 increases, the weights 53 are thrown outwardly which pulls the plate assembly 34 downwardly and through the rollers 31 causes a rotation of the airfoil spars 28 in a direction to increase the pitch of the rotating airfoils 29. This in turn results in a decrease in the speed of rotation of the airfoils. The springs 50 then tend to flatten thereby raising the plate assembly 34 and so on until a balance between speed of rotation and pitch of the airfoils is reached. Thus, the speed of rotation of the airfoils 29 is maintained constant for any power setting of the power plant 24.

Figure 2:
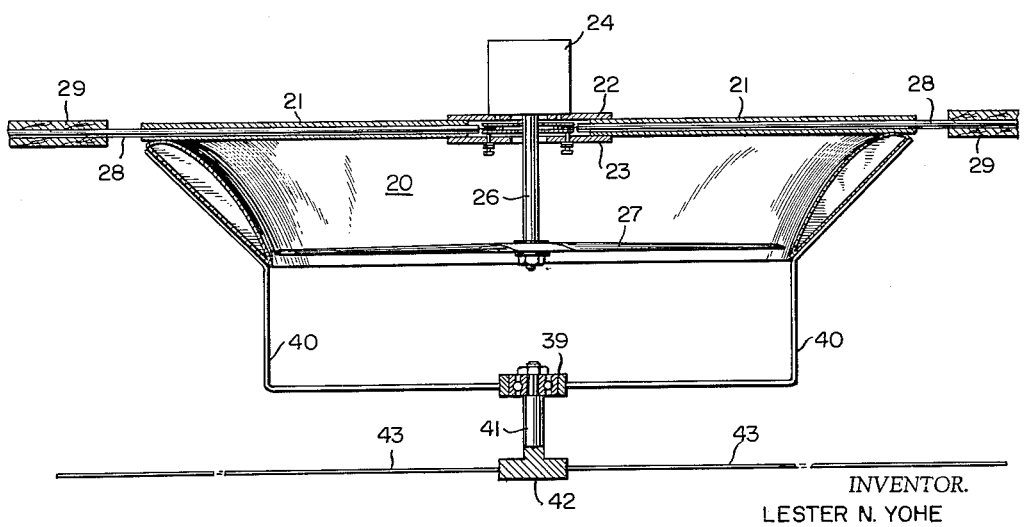
Fig. 2 is a cross-sectional view of the aircraft taken along line 2—2 of Fig. 1.
Figure 3:
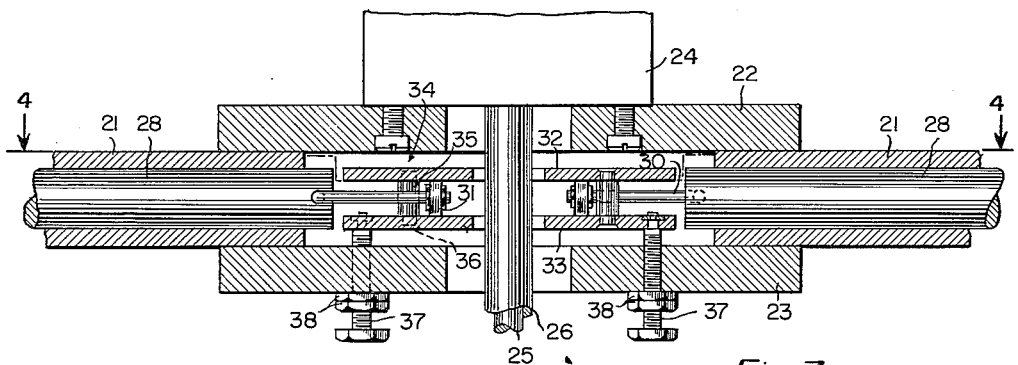
Figs. 3 and 4 are enlarged sectional views showing the manner in which the pitch of the rotating air foils is varied.
Figure 4:
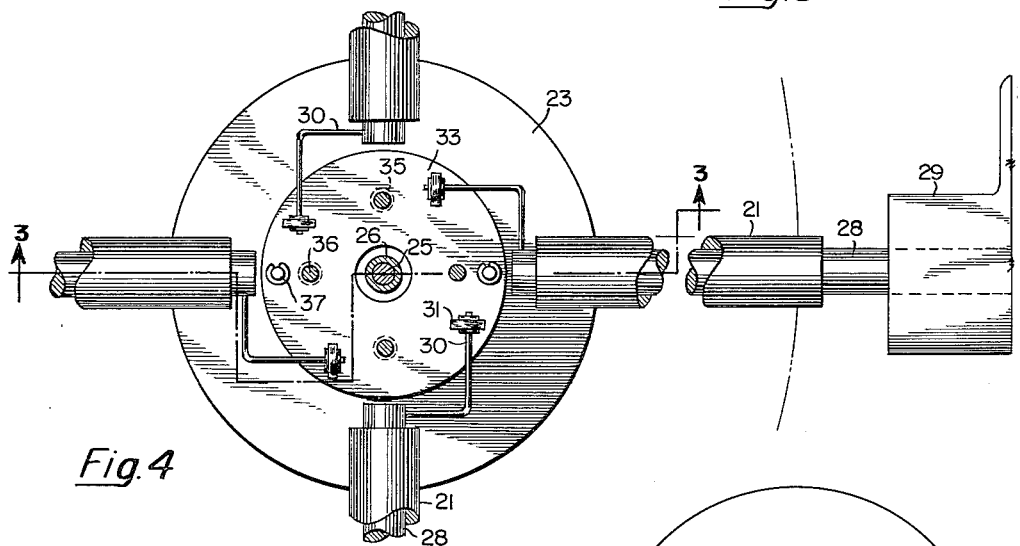

Although the means by which the spar members 28 of the rotating airfoils 29 are mounted upon or carried by the sleeve members 21, and by which the rotating airfoils are retained against the centrifugal loads thereon, are not shown in Figs. 2–4, all for the sake of clarity, these means are shown in Fig. 5. As shown, the spar members 28 are mounted for rotation relative to the sleeve members 21 by means of spaced bearings 54 and 55 and are retained against the centrifugal loads by means of tension members or wires 56 such as for example music wire. The inner end of each spar member 28 is threaded to receive a bolt 57 to which is attached one end of the wire 56, the other end of which is attached to a flange member 58 integral with or secured to the shaft housing 26.

Figure 8:
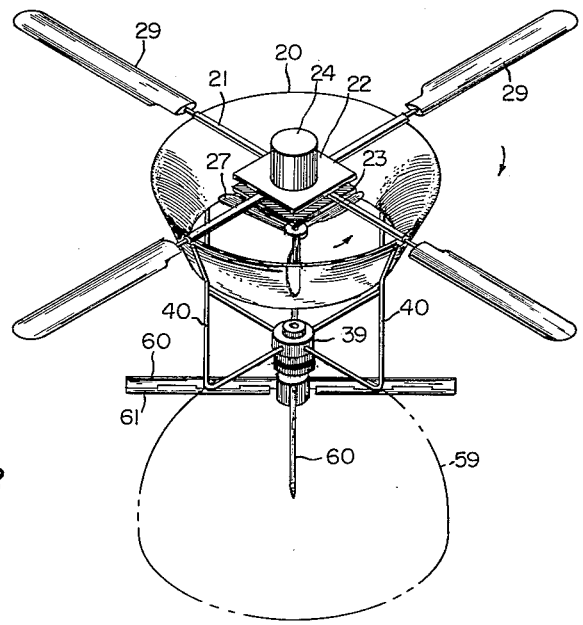
Fig. 8 is a perspective view of another aircraft in accordance with the present invention and provided with translational flight control means.
Figure 9:
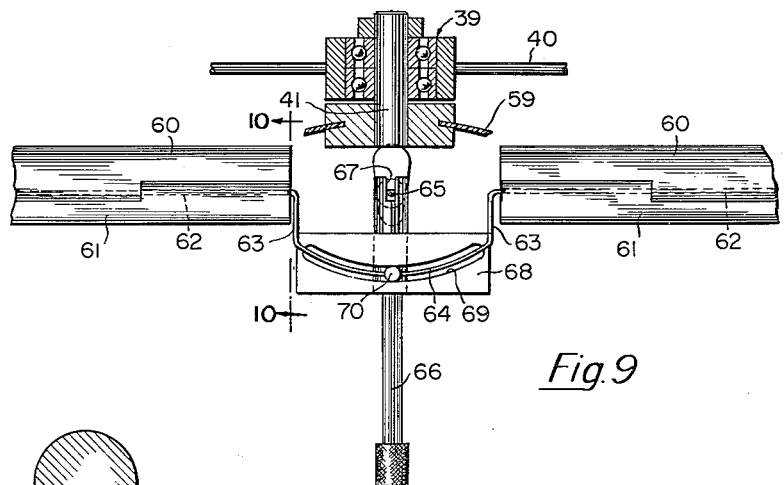
Fig. 9 is an enlarged sectional view showing the control means.
Figure 10:
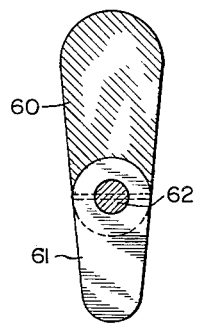
Fig. 10 is an enlarged view taken along line 10—10 of Fig. 9.

Referring now to Fig. 8, there is shown a free flight or passenger and cargo carrying aircraft embodying the present invention. This aircraft differs from that shown in Fig. 1 in that a passenger and cargo carrying or other load carrying pod 59 is suspended from the bearing 39 and is provided with four radially extending and equally spaced airfoil elements 60 which are vertically disposed and which are provided with adjustable trailing edge portions 61. As shown in Figs. 9 and 10, the adjustable trailing edge portions 61 are carried by and fixedly attached to torque tubes or rods 62 which in turn are carried by the airfoils 60 for rotation therein. The torque tubes or rods 62 of the trailing edge portions carried by the airfoils on opposite sides of the pod 59 are interconnected to provide actuation thereof in unison. As shown, the torque tubes or rods 62 of the two airfoils in the plane of the paper in Fig. 9 are provided with vertical portions or arms 63 which are joined at their lower extremities by an arcuate connector 64. The other two torque tubes or rods 62 are connected to each other by means of a straight cross rod 65 to which is hung the control stick 66. The control stick 66 is provided with an end slot 67 which is adapted to receive the rod 65, and is hinged to the rod 65 by means of a cross pin not shown for rotation into and out of the plane of the paper. The control stick 66 is also provided with a plate member 68 having an arcuate slot 69 in which is adapted to ride a pin 70 attached to the arcuate connector 64. The arrangement is such that movement of the lower end of the control stick 66 to the right or left in Fig. 9 will cause rotation of the rod 65 and hence rotation of the torque tubes or rods 62 connected thereto to thereby deflect the two trailing edge portions connected to those rods without effecting movement of the other two trailing edge portions, while movement of the lower end of the control stick 66 into and out of the plane of the paper in Fig. 9 will cause movement of the arcuate connector 64 and the arms 63, and hence rotation of the two torque tubes or rods 62 connected thereto and the two trailing edge portions carried by those rods without effecting movement of the other two trailing edge portions. It is apparent that movement of the control stick 66 in other directions will cause the simultaneous deflection of all four trailing edge portions. Thus, there are provided means for selectively adjusting the airfoils 60 by deflecting the trailing edge portions thereof, which deflected trailing edge portions deflect the air issuing from the duct 20, as well as a portion of the downstream from the rotating airfoils 29, to impart translational flight to the aircraft in a direction opposite to that of the deflected air.

Figure 11:
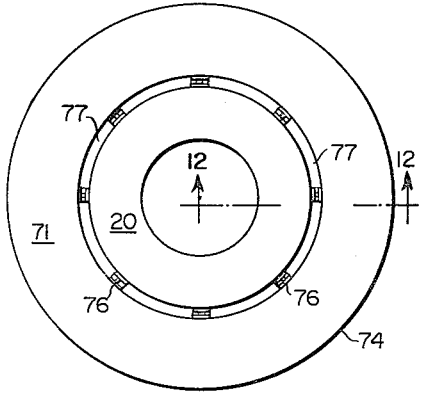
Fig. 11 is a plan view of a further embodiment of the present invention.
Figure 12:
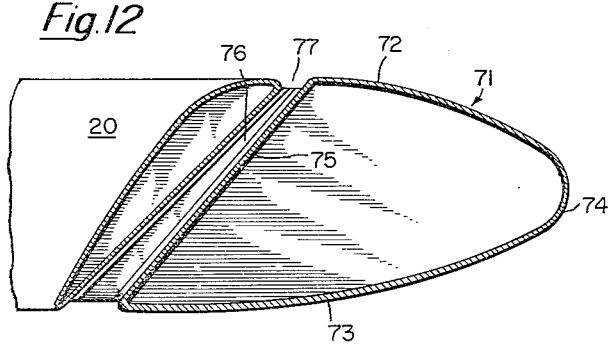
Fig. 12 is an enlarged view taken along line 12—12 of Fig. 11.

When the aircraft shown in Fig. 8 is in translational flight, the air impinging against the outer surface of the advancing side of the duct 20 tends to raise that side of the duct thereby tending to change the attitude of the duct and tending to render such aircraft unstable. To provide stability during such flight, the duct 20 may be provided with a shroud 71 as shown in Figs. 11 and 12. As shown, the shroud 71 comprises upper and lower surfaces 72 and 73 joined by a rounded outer edge 74 and an inner surface 75 and terminating in the vicinity of and fairing with the inlet and outlet of the duct 20. The shroud is attached to the duct 20 by means of a plurality of circumferentially spaced connecting membranes 76 which together with the outer surface of the duct 20 and the inner surface 75 of the shroud 71 define a plurality of annular slots 77. Circulation of air around the duct is through the slots 77 and is therefore not impaired by the presence of the shroud 71. Accordingly, the efficiency of the duct is not impaired by the presence of the shroud 71.

Although shown and described in what is believed to be the most practical and preferred embodiments, it is apparent that departures therefrom will suggest themselves to those skilled in the art and may be made without departing from the spirit and scope of the invention. I therefore do not wish to restrict myself to the particular forms of construction illustrated and described, but desire to avail myself of all modifications that may fall within the scope of the appended claims.

Having thus described my invention, what I claim is:

1. In an aircraft, the combination of an annular duct having an axis, an impeller disposed within said duct to rotate about said axis, motor means carried by said duct and adapted to drive said impeller in one direction and said duct in the opposite direction, and a plurality of airfoils carried by and extending radially from said duct for rotation therewith, and all cooperating to provide a lifting force to said aircraft.

2. The combination of claim 1 wherein said duct comprises an annular airfoil, the chord line of which is disposed at an angle of approximately 45° relative to said axis.

3. The combination of claim 1 wherein said airfoils are mounted for pitch variation, and further including means responsive to the rotational speed of said airfoils for controlling the pitch thereof.

4. The combination of claim 1 wherein said duct comprises an annular airfoil, the chord line of which is disposed at an angle to said axis.

5. The combination of claim 3 wherein said duct comprises an annular airfoil, the chord line of which is disposed at an angle of approximately 45°.

6. The combination of claim 1 wherein said duct comprises an annular airfoil, the chord line of which is disposed at an angle of approximately 45° relative to said axis to provide an inlet of diameter larger than that of the outlet and wherein said impeller is disposed near said outlet.

7. The combination of claim 1 wherein said duct comprises an annular airfoil, the chord line of which is disposed at an angle of approximately 45° relative to said axis to provide an inlet of diameter larger than that of the outlet and wherein said impeller is disposed near said outlet and is of a diameter greater than that of said outlet.

8. In an aircraft, the combination of an annular airfoil forming a duct having an inlet and an outlet, the chord line of said airfoil being disposed at an angle to the center line of said annular airfoil to provide said inlet with a diameter greater than that of said outlet, an impeller disposed within said duct and in the vicinity of the outlet thereof to rotate about the said center line of said annular airfoil, said impeller being of a diameter greater than that of said outlet, motor means carried by said duct and adapted to drive said impeller in one direction and said annular airfoil in the opposite direction, a plurality of variable pitch airfoils carried by said duct and extending radially therefrom for rotation therewith, and means responsive to the rotational speed of said airfoils for controlling the pitch thereof.

9. In an aircraft, the combination of an annular duct, an impeller disposed within said duct for rotation about the center line of the duct, motor means carried by said duct and adapted to drive said impeller in one direction and the duct in the opposite direction, a plurality of airfoils carried by said duct and extending radially therefrom for rotation therewith, a bearing rigidly suspended from said duct, a spindle carried by said bearing and provided with radially extending arms, and cable means attached to said arms and extending downwardly to fixed ground structure, said structure including means responsive to the pull of said cable means for maintaining said aircraft in a horizontal attitude.

10. In an aircraft, the combination of an annular duct, an impeller disposed within said duct for rotation about the center line of said duct, motor means carried by said duct and adapted to drive said impeller in one direction and said duct in the opposite direction, a plurality of airfoils carried by said duct and extending radially therefrom for rotation therewith, a bearing rigidly suspended from said duct, a load carrying pod suspended from said said bearing, adjustable airfoils mounted upon said pod, and means for adjusting said adjustable airfoils to produce translational flight of said aircraft by reaction therewith of the airstream descending from said duct when said impeller is rotating.

11. In an aircraft, the combination of an annular airfoil forming a duct having an inlet and an outlet, the chord line of said airfoil being disposed at an angle of approximately 45° relative to the center line of said duct, an impeller disposed within said duct and in the vicinity of the outlet thereof, motor means carried by said duct and adapted to drive said impeller in one direction and said duct in the opposite direction, and a flight stabilizer shroud surrounding said duct, said shroud including upper and lower surfaces fairing with the inlet and outlet respectively of said duct, and said shroud being attached to said duct by a plurality of spaced connections to provide a plurality of annular slots between said duct and said shroud.

References Cited in the file of this patent
UNITED STATES PATENTS

| | | |
|---|---|---|
| 1,036,122 | Kellogg | Aug. 20, 1912 |
| 1,057,225 | Decker | Mar. 25, 1913 |
| 1,191,501 | Dees | July 18, 1916 |
| 1,389,925 | Zurovec | Sept. 6, 1921 |
| 1,482,690 | Lanzuis | Feb. 5, 1924 |
| 2,876,965 | Streib | Mar. 10, 1959 |

FOREIGN PATENTS

| | | |
|---|---|---|
| 750,975 | Germany | June 1, 1944 |
| 944,102 | Germany | Dec. 19, 1955 |